United States Patent [19]
Weisman et al.

[11] 3,722,100
[45] Mar. 27, 1973

[54] TOOTH PERCUSSION INSTRUMENT

[76] Inventors: Manuel I. Weisman, 735 Oberlin Avenue, Augusta, Ga. 30902; Ira Klinger, 3222 York Drive, Augusta, Ga. 30904

[22] Filed: Sept. 8, 1971

[21] Appl. No.: 178,569

[52] U.S. Cl. ..................................32/40 R
[51] Int. Cl. ...................................A61c 3/00
[58] Field of Search..............128/2 N, 2 R; 32/40

[56] References Cited

UNITED STATES PATENTS 2,704,539   3/1955   Fisher..........................128/2 N
2,800,895   7/1957   Torpicelli....................128/2 N

*Primary Examiner*—Robert Peshock
*Attorney*—Robert G. McMorrow

[57] ABSTRACT

A device for imparting percussive force by dentists or the like to a tooth used in critical evaluation and differential diagnosis, in which an elongated housing has a spring biased plunger with graduated positions of force application. The plunger is controlled by a release mechanism, and visually observable indicia correlated to the degree of force applied is provided.

2 Claims, 6 Drawing Figures

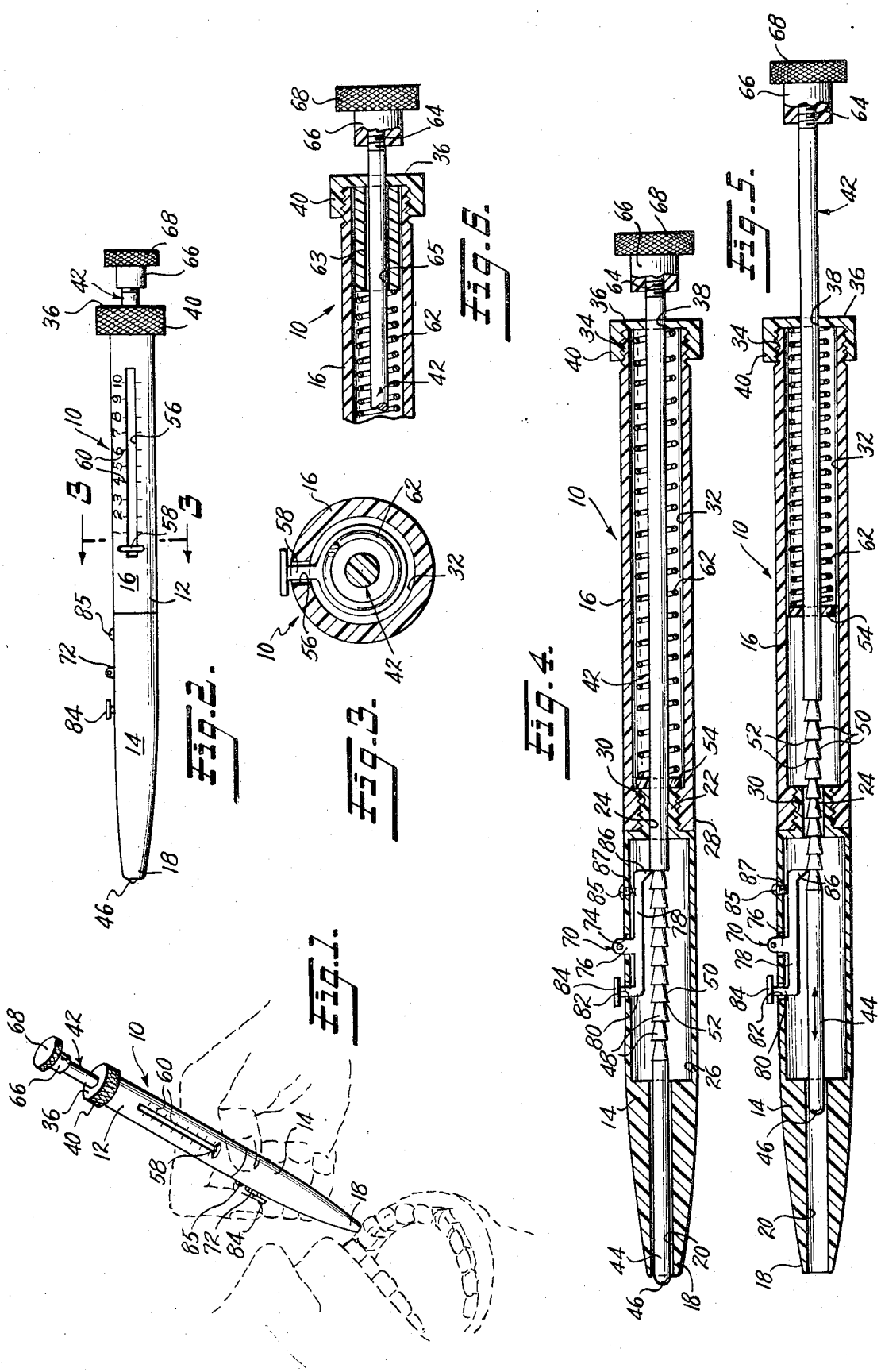

TOOTH PERCUSSION INSTRUMENT

BACKGROUND OF THE INVENTION

1. Field of the Invention

This invention relates generally to the field of dental diagnosis and more particularly to a device employed in testing for certain dental disorders such as pulpitis.

2. Statement of the Prior Art

Percussion testing is a method conventionally employed by dentists and dental specialists to evaluate the condition of the pulp and periapical tissue. The accepted method of accomplishing this test procedure is to tap the tooth with an end of a mouth mirror or other instrument handle (see Ingle, J. I., *Endodontics*, Philadelphia, 1965, Lea & Febiger, pp. 309–310; Sommer, R. F., Ostrander, D. F., Crowly, M. D., *Clinical Endodontics*, Philadelphia, ed. 3, 1966, W. B. Saunders Co., pp. 275–301; Grossman, L. I., *Endodontic Practice*, ed. 7, Philadelphia, 1970, Lea & Febiger, pp. 5–6; and Abramson, I. I., Norris, P. J., *Atlas of Endodontic Technique*, St. Louis, 1966, C. V. Mosby Co., pp. 8–15). This method is subject to adverse criticism in that it is lacking in accuracy and is not susceptible to recordation as a controlled numerical entity. Prior patents having structural or functional relation to the present invention are, representatively, as follows:

| Patent No. | Patentee | Issue Date |
|---|---|---|
| 158,888 | Baxter | Jan. 19, 1875 |
| 283,828 | Stevenson | Aug. 28, 1883 |
| 625,043 | Lewis | May 16, 1899 |
| 2,130,269 | Dietert | Sept. 13, 1938 |
| 2,337,971 | Caviglia | Dec. 28, 1943 |
| 2,620,654 | Campbell | Dec. 9, 1952 |

SUMMARY OF THE INVENTION

The present invention is principally directed to the provision of means whereby a dentist, clinician or researcher in the field of dentistry is enabled to apply a percussion test via a numerical or other scale. In prior art methods, involving striking the tooth manually with another dental instrument, inadequate accuracy and uniformity are present, and there is no means of recordation of data related to a scientific numerical scale. Apparatus according to the present invention provides a controlled and measurable means to accomplish this purpose.

The present invention provides a housing having a spring loaded plunger and a related scale showing the load applied to the spring. Thus, development of standardized percussion reaction is facilitated. The spring load is of an amplitude such as to be harmless to tooth enamel, dentin, pulp, and supporting tissue even at its extreme setting.

The instrument hereof is adapted for fabrication from materials susceptible to sterilization. The apparatus is of non-complex construction and assembly, and is inexpensive to manufacture.

Other and further objects and advantages of the invention will become apparent to those skilled in the art from a consideration of the following specification when read in conjunction with the annexed drawing.

BRIEF DESCRIPTION OF THE DRAWING

FIG. 1 is a perspective view of a tooth percussion instrument according to this invention as employed in a dental test procedure;

FIG. 2 is an enlarged top plan view of the instrument;

FIG. 3 is a further enlarged detail cross-sectional view, taken substantially on line 3—3 of FIG. 2, looking in the direction of the arrows;

FIG. 4 is a longitudinal cross-sectional view of the instrument showing the plunger in released position;

FIG. 5 is a view similar to FIG. 4, but showing the plunger in extreme loaded position; and FIG. 6 is a partial sectional view of a modification.

DESCRIPTION OF THE PREFERRED EMBODIMENT

Referring to the drawing in more detail, a tooth percussion instrument of a construction and operation suited to the purposes of this invention is therein generally identified by reference character 10. The instrument 10 comprises an elongated housing 12 of plastic or metal which, when assembled, is of elongated, narrow form. The housing is of a dimension suitable for use in the mouth, and is readily held by the operator in one hand in the manner illustrated in FIG. 1. The housing 12 is preferably formed of a first barrel section 14 and a second barrel section 16. The section 14 comprises a reduced distal tip end 18 having a bore 20 extending axially therethrough, and a reduced diameter proximal end 22 which is provided with external threads. The proximal end 22 has a second bore 24 therein of a diameter substantially equal to that of the first bore, and said bores each open on an enlarged central passageway 26.

The housing further includes the aforesaid second barrel section 16 having a proximal end section 28 formed with internal thread means at 30 for connection with the reduced end 22 of the first barrel section. The section 16 is substantially tubular and has an enlarged main passageway 32, the section terminating at an outwardly threaded distal end 34. The distal end 34 of the assembled instrument is closed by a cap 36 having an opening 38, the cap including a threaded side 40 for engagement with the end 34.

An elongated plunger 42 is mounted for movement in the housing through the respective bores, passageways and openings. The plunger includes a striking end 44 with a tip 46, and a series of stops 48, each having a cam wall 50 and a substantially perpendicular shoulder 52. The portion of the plunger within said main passageway 32 has an annular collar 54 fixed thereto. As shown in FIG. 2, the second barrel section has an elongated longitudinal slot 56 formed therein, and an extension 58 of the collar extends through the slot and is visible in relation to a series of markings or indicia 60 on the barrel adjacent the slot. Alternatively, an indicator may be located directly on the plunger in such position as to be observable through the slot 56.

A coil spring 62 is located in the second barrel section about the plunger and is engaged at one end against the collar 54 and at the other end against the cap 36. Thus, the spring exerts a constant bias to propel the plunger in the direction of the end 18.

As shown in FIG. 6, a cylindrical sleeve 63 having a bore 65 through which the plunger extends may be disposed in the barrel between the cap 36 and the spring 62 in order to adjust the tension on the spring.

The outer end 64 of the plunger is threaded to receive a nut 66 having an enlarged, knurled handle 68 thereon. The handle is employed to manually exert a force on the plunger for cocking the same to a loaded position.

Catch means 70 for holding the plunger in said loaded position and for release of the plunger when desired, comprises an upstanding ear 72 secured to the forward barrel section adjacent an opening 74 therein. Pivotally secured to the ear is a central pivot arm 76 of a lever 78. One end of the lever has an upturned portion 80 which extends outwardly through a second barrel opening 82, and the upturned portion 80 carries a button 84 exteriorly of the housing. The opposite end of the lever has an inward pawl 86 adapted for engagement with the stops 48 by abutment against the shoulders 52. A screw 85 has a small spring 87 on the inner end thereof to bias the lever into said engagement position.

The operation of the invention involves selection by the operator of a desired degree of percussion to be exerted on the area to be tested, followed by withdrawal of the plunger in the housing to a position in which the extension 58 is located at the indicia signifying the selected force. The button 84 is then pulled outwardly causing the pawl 86 to engage against a corresponding shoulder thereby holding the plunger at the selected force level. The instrument is then placed against the area to be tested, and the button 84 depressed thereby pivoting the lever and moving the pawl out of engagement with the plunger stop. This releases the plunger and permits the spring to propel it outwardly. It will be observed that the instrument thereby facilitates controlled and measurable force application.

We claim:

1. A dental instrument for the application of measured percussion to a tooth surface, the instrument comprising:

an elongated housing dimensioned for application to a tooth within a mouth and including separable barrel sections each having a passageway therein;

an elongated plunger mounted for movement within the passageways and having a handle end and a force application tip;

a series of graduated stops on the plunger, each stop comprising a substantially conical body portion having a perpendicular shoulder and a cam wall extending in the direction of the handle end of the plunger;

the housing having an elongated, longitudinally extending slot formed therein, and having indicia thereon adjacent said slot;

a coil spring about the plunger and a collar on the plunger engaging the spring to compress the same upon inward movement of the plunger responsive to withdrawal of the handle outwardly of the housing;

the collar having an extension thereon projecting through the slot and observable relative to the indicia; and catch means on the housing to selectively engage the graduated stops upon movement of the plunger in said inward direction and to release the plunger upon actuation, said catch means comprising a pivotal lever having an outer button and a pawl extending into the housing to engage the shoulders of the stops, depression of the button serving to pivot the pawl out of contact with the shoulder and to release the plunger.

2. The invention of claim 1 wherein:

said barrel sections comprise a first barrel section and a second barrel section, said sections being threadedly secured to one another and the passageways therein being coaxial.

* * * * *